(12) United States Patent
Hiroi

(10) Patent No.: US 6,204,887 B1
(45) Date of Patent: Mar. 20, 2001

(54) METHODS AND APPARATUS FOR DECODING AND DISPLAYING MULTIPLE IMAGES USING A COMMON PROCESSOR

(75) Inventor: Kazushige Hiroi, Cupertino, CA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/329,810

(22) Filed: Jun. 10, 1999

Related U.S. Application Data (60) Provisional application No. 60/112,031, filed on Dec. 11, 1998.

(51) Int. Cl.[7] ............................... H04N 5/45; H04N 9/74
(52) U.S. Cl. ......................... 348/565; 348/568; 348/596; 348/588
(58) Field of Search ................................... 348/564, 565, 348/567, 568, 584, 586, 588, 596, 581; H04N 5/445, 5/45, 9/74

(56) References Cited

U.S. PATENT DOCUMENTS

| | | | |
|---|---|---|---|
| 4,238,773 | * 12/1980 | Tsuboka et al. | 358/183 |
| 4,845,644 | * 7/1989 | Anthias et al. | 364/521 |
| 4,931,879 | * 6/1990 | Koga et al. | 358/335 |

(List continued on next page.)

FOREIGN PATENT DOCUMENTS

| | | |
|---|---|---|
| 0 537 030 A2 | * 4/1993 | (EP) . |
| WO 94/09595 | 4/1994 | (WO) . |

OTHER PUBLICATIONS

A. Hoffmann, B. Macq and J.J. Quisquater, "Future Prospects of the Cable TV Networks, New Technologies and New Services", Laboratoire de Telecommunications et Teledetection, pp. 13–22.*

International Standards Organization—Moving Picture Experts Group, Recommendation H.222.0, ISO/IEC 13818–1 titled "Information Technology—Generic coding of Moving Pictures and Associated Audio: Systems", Nov. 13, 1994, pp. ii–130.*

International Standards Organization—Moving Picture Experts Group, Recommendation ITU–T H.262, ISO/IEC 13818–2 titled "Information Technology—Generic Coding of Moving Pictures and Associated Audio Information: Video", Nov. 9, 1994, pp. i–222.*

*Primary Examiner*—Sherrie Hsia
(74) *Attorney, Agent, or Firm*—Straub & Pokotylo; Michael P. Straub (57) ABSTRACT

Methods and apparatus for processing data representing multiple image sequences, e.g., TV programs, and displaying multiple images from different video sequences in different windows of a single display screen are disclosed. The amount of system resources required to process and display the image data are a function of the size of the windows in which the images are displayed. In accordance with the present invention demand for system resources is assessed and compared to the amount of available system resources. If the demand for system resources will exceed the available system resources, the size of one or more of the windows used to display secondary images, e.g., the small PIP windows, is reduced to reduce the burden, e.g., processing or bus bandwidth burden, on one or more system resources. In one embodiment, the system suggests a set of window sizes to the user which will allow for the decoding and display of programs without exceeding the available system resources. The user can accept or modify the suggested program window sizes. When the user input results in the use of window sizes that will result in a demand for system resources that exceeds the available resources, data corresponding to inter-coded frames is ignored and/or decoding and display of secondary images is limited to images with significant scene changes.

24 Claims, 7 Drawing Sheets

U.S. PATENT DOCUMENTS

| | | | |
|---|---|---|---|
| 5,091,785 | * 2/1992 | Canfield et al. | 358/183 |
| 5,237,460 | * 8/1993 | Miller et al. | 360/8 |
| 5,313,303 | * 5/1994 | Ersoz et al. | 348/439 |
| 5,335,117 | * 8/1994 | Park et al. | 360/48 |
| 5,361,098 | * 11/1994 | Lucas | 348/565 |
| 5,367,318 | * 11/1994 | Beaudin et al. | 345/201 |
| 5,386,241 | * 1/1995 | Park | 348/565 |
| 5,390,052 | * 2/1995 | Kato et al. | 360/32 |
| 5,398,072 | * 3/1995 | Auld | 348/426 |
| 5,408,270 | * 4/1995 | Lim | 348/429 |
| 5,420,641 | * 5/1995 | Tsuchida | 348/556 |
| 5,433,677 | * 7/1995 | Do | 348/568 |
| 5,463,422 | * 10/1995 | Simpson et al. | 348/390 |
| 5,469,223 | * 11/1995 | Kimura | 348/581 |
| 5,477,397 | * 12/1995 | Naimpally et al. | 360/10.3 |
| 5,614,957 | * 3/1997 | Boyce et al. | 348/567 |
| 5,642,498 | 6/1987 | Kutner | 395/509 |

\* cited by examiner

| ORIGINAL IMAGE SIZE | | DISPLAY WINDOW SIZE | | THE LOAD OF SYSTEM RESOURCE |
|---|---|---|---|---|
| HORIZONTAL 408 | VERTICAL 410 | HORIZONTAL 412 | VERTICAL 414 | |
| OH1 | OV1 | DH1 | DV1 | L1 |
| OH2 | OV2 | DH2 | DV2 | L2 |
| OH3 | OV3 | DH3 | DV3 | L3 |
| OH4 | OV4 | DH4 | DV4 | L4 |
| ⋮ | ⋮ | ⋮ | ⋮ | ⋮ |

METHODS AND APPARATUS FOR DECODING AND DISPLAYING MULTIPLE IMAGES USING A COMMON PROCESSOR

RELATED APPLICATIONS

This application claims the benefit of U.S. Provisional Application No. 60/112,031, filed Dec. 11, 1998 and which is hereby expressly incorporated by reference.

FIELD OF THE INVENTION

The present invention relates to methods and apparatus for decoding and displaying images and, more particularly, to methods and apparatus for decoding multiple images to be displayed at the same time, using limited resources.

BACKGROUND OF THE INVENTION

Television sets and many other video display devices, e.g., computers, support the ability to simultaneously display multiple images. In the case of television sets, the ability to display multiple images at the same time is often called picture-in-picture (PIP) capability. In the case of computer systems, the display of multiple images at the same time often occurs when multiple windows are open simultaneously in a system which supports windows based user interfaces.

In order to reduce data storage and transmission bandwidth requirements, video signals and images, e.g., digital television signals, are normally compressed prior to transmission and/or storage. Even in compressed, e.g., encoded form, video images can comprise a large amount of data. Before being displayed they must normally be decoded. Decoding of images can require a considerable amount of processing resources.

When video programs comprising sequences of images are being displayed, the images in each window need to be updated as the image sequence being displayed in a given window changes, e.g., due to motion in the images being displayed. Accordingly, to display a video sequence including motion, multiple images represented by, e.g., frames, need to be decoded and displayed over a period of time.

The number of images which are to be displayed in a given period of time for a given video image is often called the frame rate. It is frequently expressed in terms of frames per second. The time used to display a single image is called a frame time.

In the case of a television, decoder circuitry is often subject to real time processing constraints. In other words, the video images must be decoded in an amount of time equal to, or less than, the time that will be used to display the images. Failure to meet real time decoding requirements can result in the loss of data, e.g., frames, which may give the appearance of jerky motion. It may also cause other image errors and/or distortions which can result in an unpleasant and/or undesirable viewing experience.

When video sequences are being displayed in multiple windows at the same time, to support real time decoding of all the images in the video sequences being displayed, a decoder must be able to decode, on average, a number of images at a rate equal to the sum of the frame rates for each of the individual video sequences being displayed.

In addition to decoder processing resources, supporting the simultaneous display of multiple images and/or video sequences can place a considerable burden on other system resources as well. The large amount of data associated with video images which must be transferred for decoding, in some cases, can exceed a system's available bus bandwidth. This is particularly the case when multiple images are to be decoded and displayed simultaneously.

The demand for decoder processing and/or bus resources is a function of the number of images which must be decoded and displayed in a fixed amount of time. In the case of a PIP embodiment, such as a PIP capable television system, the demands on video decoder processing and bus resources can be considerable.

When more than two video sequences are displayed on a system, e.g., a television or computer, if the total load on the system resources, e.g., CPU and/or bus, required to decode and display the video sequences exceeds the available resources, images in the sequences will normally be degraded and/or discarded. The inability to fully decode images to be displayed in all of a systems open windows may result in jerky motion in one or more image sequences.

This may cause a viewer of the decoded images to feel uncomfortable. In addition, it might also make it difficult for a viewer to follow the video sequences, e.g., TV programs, being displayed. Such consequences of limited system resources could potentially defeat the purpose of displaying multiple images on a single screen.

In view of the above remarks, it is apparent that there is a need for methods and apparatus for allocating resources when multiple images, or multiple sequences of images, are to be decoded and displayed on a single display device. There is also a need for reducing or limiting the demand for decoder and display resources, e.g., to levels which are available in a given system.

SUMMARY OF THE PRESENT INVENTION

The present invention relates to methods and apparatus for processing data representing multiple image sequences, e.g., TV programs, and displaying multiple images from different video sequences in different windows of a single display screen. The methods and apparatus of the present invention can be used to implement televisions, computers and various other systems which display images.

The amount of system resources required to process and display image data representing, e.g., TV programs, is a function of the size of the windows in which the program images are displayed. In accordance with the present invention demand for system resources is assessed and compared to the amount of available system resources. If the demand for system resources will exceed the available system resources, the size of one or more of the windows used to display secondary images, e.g., the small PIP windows, is reduced to reduce the burden, e.g., processing or bus bandwidth burden, on one or more system resources. The evaluation of the demand on processing resources and adjustment of display window sizes may be, and in various embodiments is, performed periodically e.g., at pre-selected time intervals corresponding to multiple frame times.

In one embodiment, the system suggests a set of window sizes to the user. The suggested window sizes allow for the decoding and display of programs without exceeding the available system resources. The user can accept or modify the suggested program window sizes. When the user input results in the use of window sizes that will result in a demand for system resources that exceeds the available resources, data corresponding to inter-coded frames is ignored and/or decoding and display of images in one or more secondary programs is limited to images with significant scene changes e.g., images with more than 40% new content from the previous frame.

In one PIP embodiment, the secondary programs are the programs displayed in the smaller windows as opposed to the main picture window.

Thus, in accordance with the techniques of the present invention, the processing of data to be displayed in multiple windows at the same time can be done in a manner that does not exceed the available system resources, e.g., processor or bus bandwidth resources.

In addition to the above described embodiments and features, numerous additional features, embodiments and advantages of the methods and apparatus of the present invention are discussed below.

DETAILED DESCRIPTION

As discussed above, the present invention relates to methods and apparatus for decoding multiple images to be displayed at the same time, using limited resources.

Figure 1:
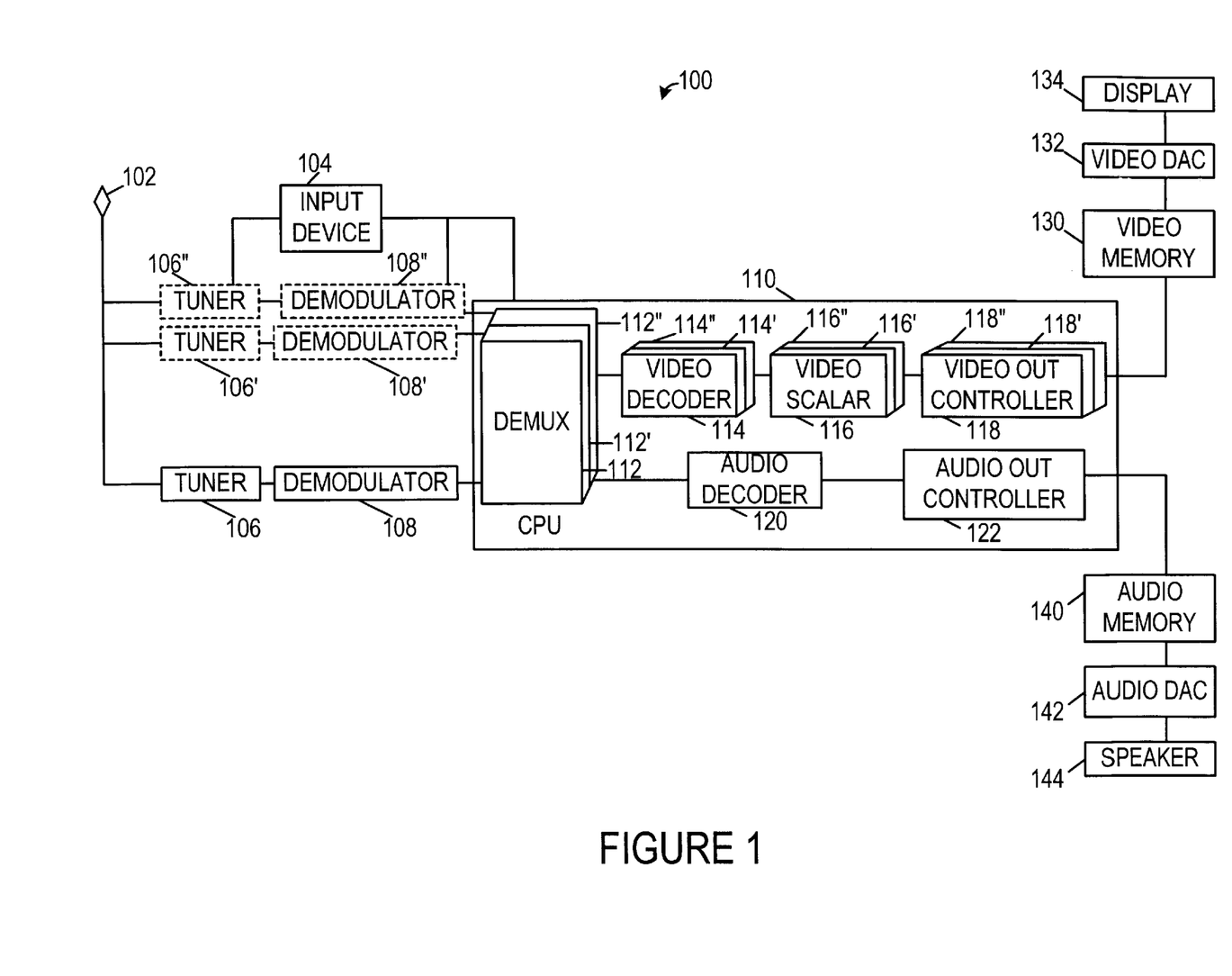
FIG. 1 illustrates a video system implemented in accordance with a first embodiment of the present invention.

FIG. 1 illustrates a system 100 for processing data corresponding to multiple image sequences, e.g., television programs. Images from different programs may be displayed at the same time as will be discussed below in regard to FIGS. 3A and 3B. As illustrated the system 100 comprises an antenna 102 for receiving television programs, e.g., digital television signals. In addition, the system 100 includes an input device 104, e.g., a keyboard or control panel, a central processing unit (CPU) 110, a video memory 130, a video digital to analog converter (DAC) 132, a display 134, an audio memory 140, an audio digital to analog converter 142 and a speaker 144. The components of the system 100 are coupled together as illustrated in FIG. 1.

The system 100 also includes tuners and demodulators arranged in pairs (106, 108), (106', 108') and (106", 108"). The tuner/demodulator pairs couple the antenna 102 to the CPU 110 and serve to provide channel selectivity.

While three tuner/demodulator pairs are shown any number of such devices may be supported. Each tuner/demodulator pair is used to support a different user selectable video channel corresponding to, e.g., television programs, which may be decoded and displayed at any given time. Thus, while the input signal to each of the tuners 106, 106', 106" is the same, the output signal of each of the corresponding demodulators 108, 108', 108" will normally represent a different user selected video/audio program.

The input device 104 receives user input, e.g., representing channel selections or window size information, and supplies this information to the various tuner/demodulator pairs (106, 108), (106', 108') and (106", 108") and CPU 110. While the connections between the input device 104 and the tuner/demodulator pairs (106, 108) and (106', 108') are not shown in order to simplify the illustration, it is to be understood that there are connections between input device 104 and each of the tuner/demodulator pairs (106, 108), (106', 108') and (106", 108").

The user can provide input information, via input device 104, indicating that the tuner/demodulator pair (106, 108) should be set to select and demodulate a signal corresponding to a first communication channel, that the tuner/demodulator pair (106', 108') should be set to select and demodulate a signal corresponding to a second communication channel, and that the tuner/demodulator pair (106", 108") should be set to select and demodulate a third communication channel.

The CPU 110 receives the digital signals output by each of the first, second and third tuner/demodulator pairs. The received digital signals represent encoded video and/or audio programs corresponding to different channels. The signal corresponding to each channel is processed by the CPU 110 to generate a digital video output signal. A single audio output signal is generated from one of three input program signals. Each of the three video output signals may represent a sequence of frames, wherein each frame includes a plurality of images, each image being displayed in a different window of the frame and possibly corresponding to a different program.

The digital video output signals are stored in the video memory 130 which serves as a frame buffer. By storing the video output signals in the frame buffer, images from multiple video output signals are combined into a single frame. Periodically, e.g., whenever the display 134 is to be refreshed, a frame stored in the video memory 130 is output to the video DAC 132. The DAC 132 converts the received digital frame data into an analog signal which is used to control the display 134 to generate a video image representing the frame to be displayed.

While video images corresponding to multiple programs may be combined and displayed simultaneously at any given time, e.g., in different program windows, the system 100 generates and outputs a single audio signal at any given time. The audio signal normally corresponds to one of the received programs which is being displayed. The audio signal generated by the CPU 110 is stored in the audio memory 140. The digital audio data e.g., stored in memory 140, is then converted into an analog signal by audio DAC 142. The analog audio signal is used to control the speaker 144.

In the FIG. 1 embodiment, a single central processor 110 and the circuitry, e.g., internal memory and processing circuitry included therein, is used to perform a wide range of video and audio decoding operations. In the FIG. 1 embodiment, software routines, also sometimes referred to as components, are used to control the CPU 110 to perform various de-multiplexing, video decoding, video scaling, video output, audio decoding and audio output functions. In FIG. 1, a box is used to represent the software routine or component which is executed by the CPU 110 to perform each function. Each of the functions performed by a routine may, alternatively, be implemented using dedicated hardware circuitry which is either internal or external to the CPU 110. Thus, embodiments including dedicated hardware circuitry for performing one or more of the functions performed using software routines in the FIG. 1 embodiment are contemplated and within the scope of the invention.

First through third de-multiplexing routines 112, 112', and 112" are each responsible for de-multiplexing, into separate audio and video portions, one of the input program signals received via the first through third tuner demodulator pairs (106, 108), (106', 108') and (106", 108"), respectively.

The audio signal portion of a user selected one of the program signals is supplied by one of the de-multiplexers 112, 112', 112" to the audio decoder routine 120. The decoded audio signal generated by the audio decoder routine 120 is stored in the audio memory 140 under control of the audio output controller routine 122. The output audio signal normally corresponds to the program whose images are displayed using the largest amount of screen area, e.g., the main picture. However, the audio output at any given time may be selected by the user to correspond to the program being displayed in any one of the windows included on the display 134.

As discussed above, the CPU 110, under control of de-multiplexer routines 112, 112', 112" performs audio/video de-multiplexing operations for each of the different program signals input thereto. Since there are three input programs, in the FIG. 1 embodiment, three video signals are produced as a result of the first through third video/audio de-multiplexing operations performed using routines 112, 112', 112".

Each of the first through third video signals are then processed prior to the images being combined, e.g., in the memory 130, to form one or more screen displays.

The first through third video decoding operations are performed using routines 114, 114', 114", first through third image scaling operations are performed using routines 116, 116', 116", and first through third video output control operations are performed using routines 118, 118', 118".

The video signals produced by each of the first through third de-multiplexing operations may be, e.g., MPEG video streams. The first through third video decoding routines 114, 114' and 114" are responsible for performing video decoding, e.g., decompression, operations on the corresponding first through third video signals produced by de-multiplexer routines 112, 112', 112". The decoding routines 114, 114', 114" produce first through third video signals representing images to be displayed. The decoded video signals are scaled by scaling routines 116, 116' and 116". Each image is scaled to a size corresponding to the size of the window in which the decoded image is to be displayed. Video output controller routines 118, 118' and 118" are responsible for outputting the scaled image data so that the images corresponding to each program window are stored in the video memory in the appropriate memory locations so that, when displayed, they will appear at the correct positions on the display device's screen.

The amount of processing which must be performed by the CPU 110 is a function of the number of programs which are to be processed and displayed during any given time period. When images corresponding to multiple programs are to be decoded and displayed in real time, e.g., in different windows of a single screen, the processing load associated with decoding and displaying images from multiple programs may exceed the CPU's processing power. In addition, the amount of data needed to be transmitted over the CPU's internal bus or a bus coupling the CPU to a memory device, e.g., video memory 130 or reference frame memory (see, e.g., FIG. 2B elements 115, 168), may exceed the bus's bandwidth.

Figure 3A:
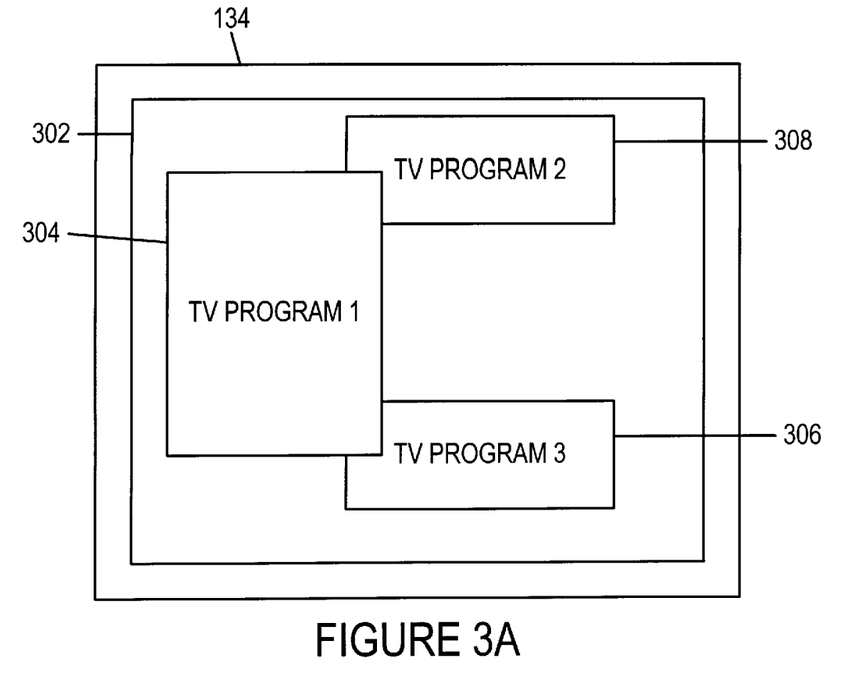
FIGS. 3A and 3B illustrate a display device including a screen having a plurality of windows in which images from different video programs are displayed at the same time.
Figure 3B:
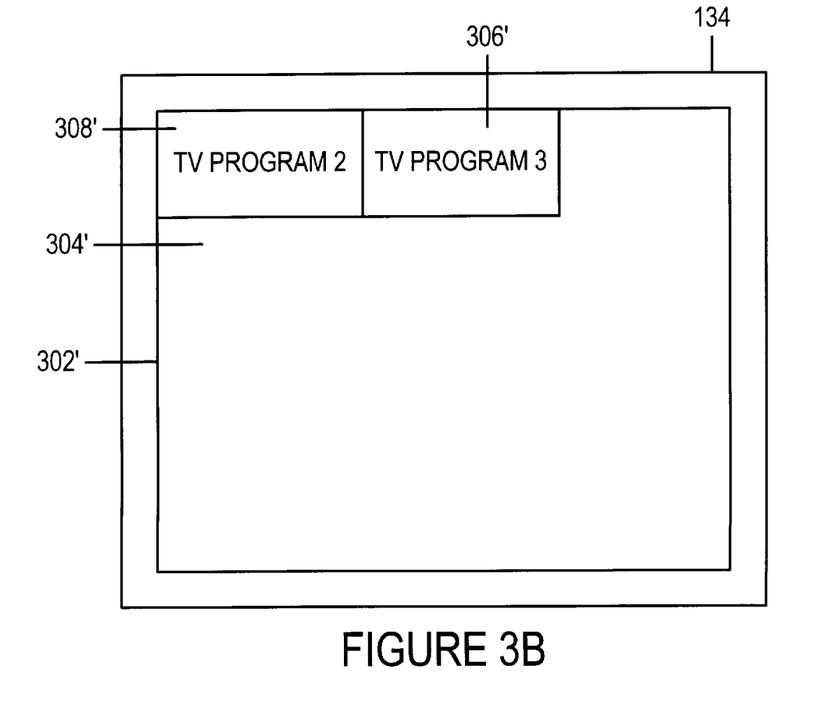

FIGS. 3A and 3B illustrate exemplary screens which may be produced on the display 134 in accordance with the present invention. In FIG. 3A, a single screen 302 comprises first through third windows 304, 308, 306. Each of the windows is used to display a different television program resulting in the simultaneous display of images from 3 different programs. In FIG. 3B a first television program is displayed in a main picture window 304' which comprises the portion of the screen 302' which is not occupied by inset picture windows 306', 308'.

As will be appreciated, the FIG. 3A display more closely approximates the image format to which many people using computer applications are accustomed while FIG. 3B illustrates the format more commonly used in PIP television sets. The methods and apparatus of the present invention may be used with either of the FIG. 3A or 3B screen formats. In the FIG. 3A embodiment, the size of each window 304, 306, and 308 corresponds to the window's rectangular dimensions without subtracting out the overlapping window portions. In the case of the FIG. 3B embodiment, the size of the window used to display the main picture would correspond to the rectangular size of the screen 302'. While the size of inset picture windows 306' and 308' would correspond to rectangular size of windows 306' and 308'. In other embodiments, window size does not include covered or overlapped portions of a window.

The amount of processing resources required to decode a set of image data may vary as a function of final image display size. U.S. Pat. No. 5,614,957 describes a plurality of ways in which video decoder processing requirements may be reduced when an image is to be decoded for display as an inset picture for picture-in-picture display purposes. Accordingly, video decoder processing requirements may be a function of the size of the window in which an image that is being decoded is to be displayed.

The amount of processing resources required to scale a set of image data tends to be a function of final image display size. Images displayed in larger windows often require more processing resources to scale than images which are to be displayed in smaller windows.

It normally takes less data to represent a small image than a large image assuming the same output image resolution. Accordingly, an image which is to be displayed using a small window can usually be represented using less data than an image that is displayed using a large window. The smaller the amount of data used to represent an image, the smaller the amount of bus bandwidth required to transmit e.g., to the video frame memory 130, the image data in a given amount of time.

In view of the above, it is apparent that processing resources required to perform scaling and/or decoding operations can be reduced by reducing the size of one or more of the windows in which images are displayed. The demand for bus resources, e.g., bandwidth, may also be reduced by reducing the size of one or more windows in which images are displayed.

Figure 2A:
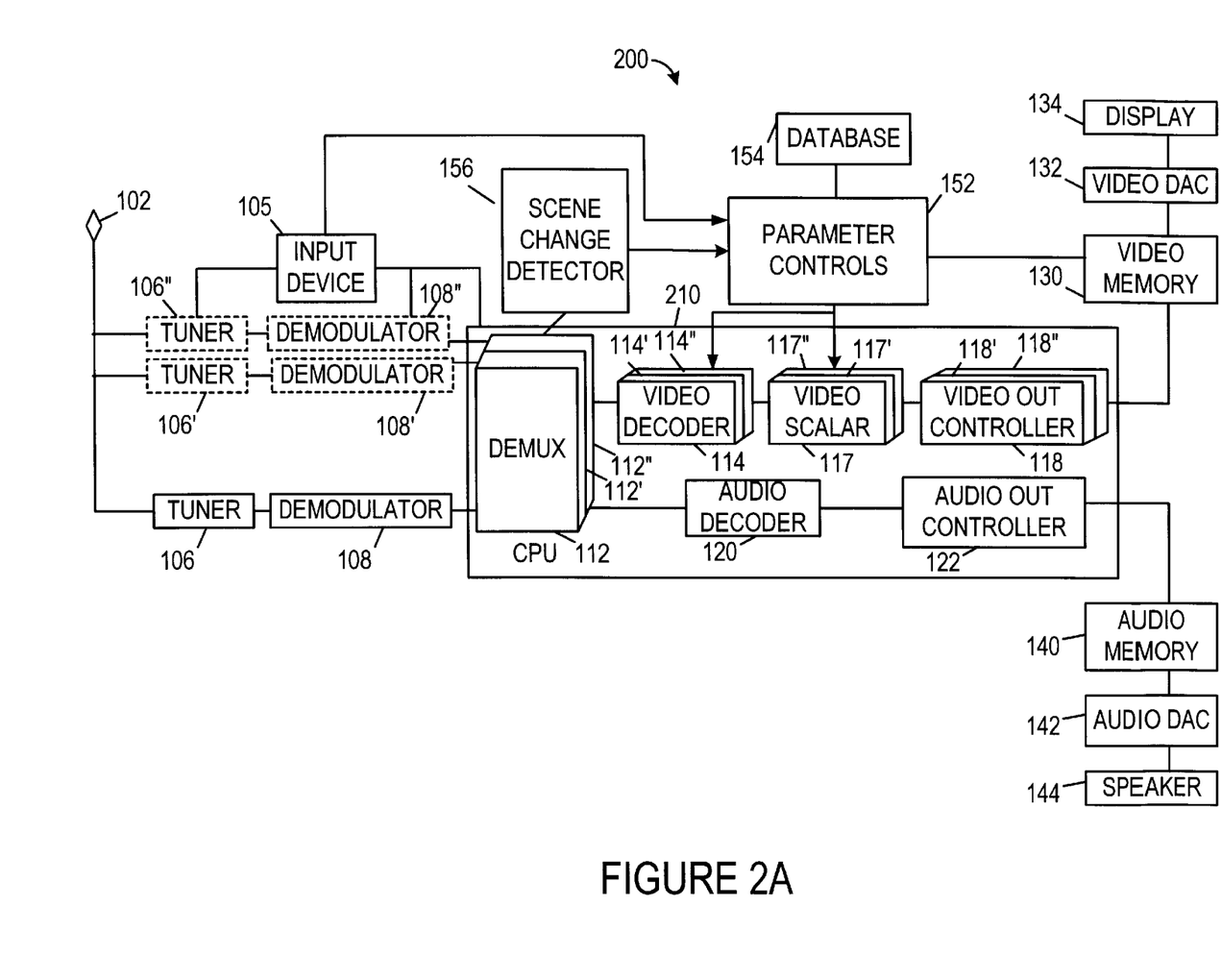
FIGS. 2A–2C illustrate various systems, implemented in accordance with the present invention, for displaying multiple images on a display device at the same time.
Figure 2B:
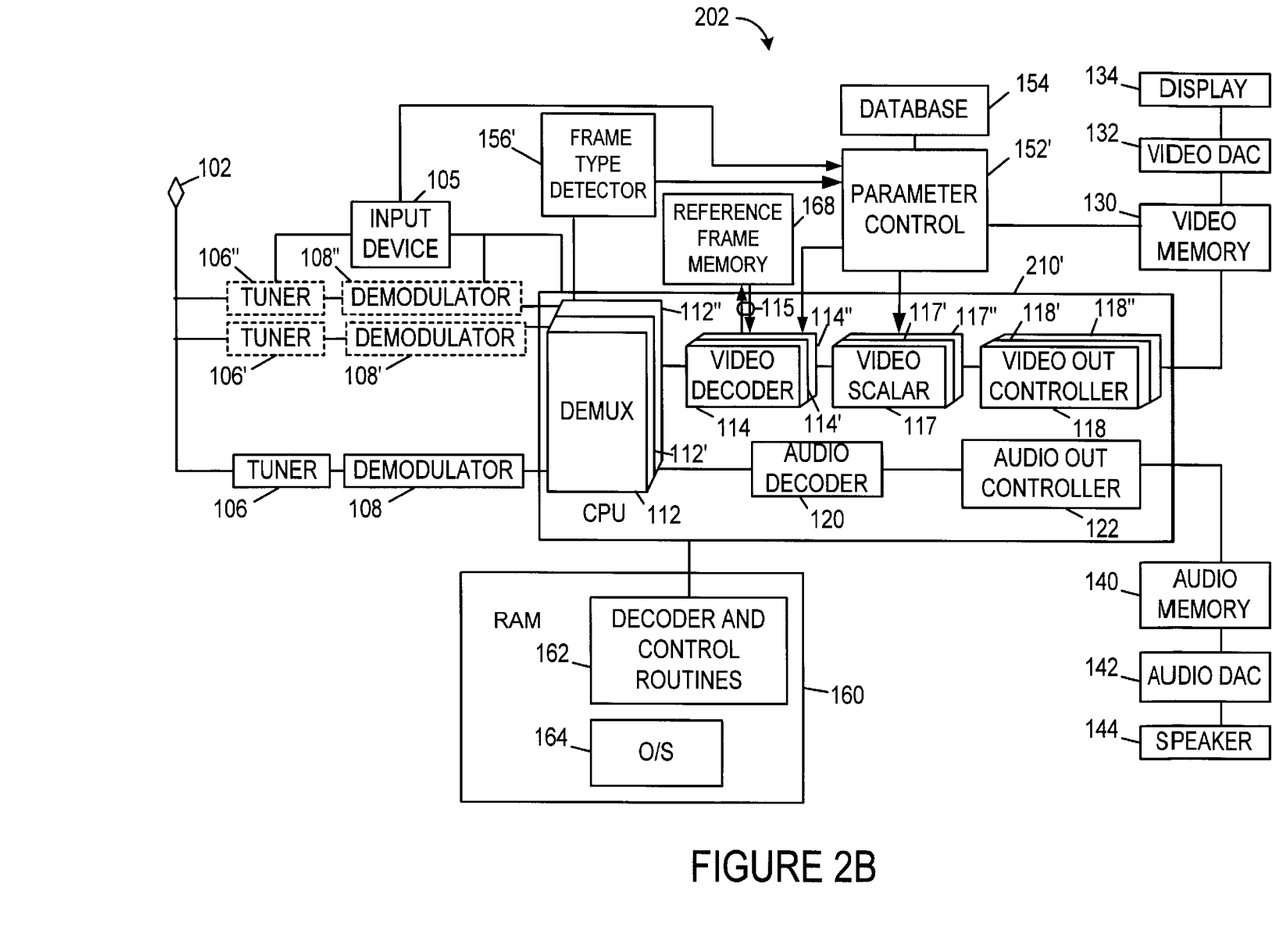
Figure 2C:
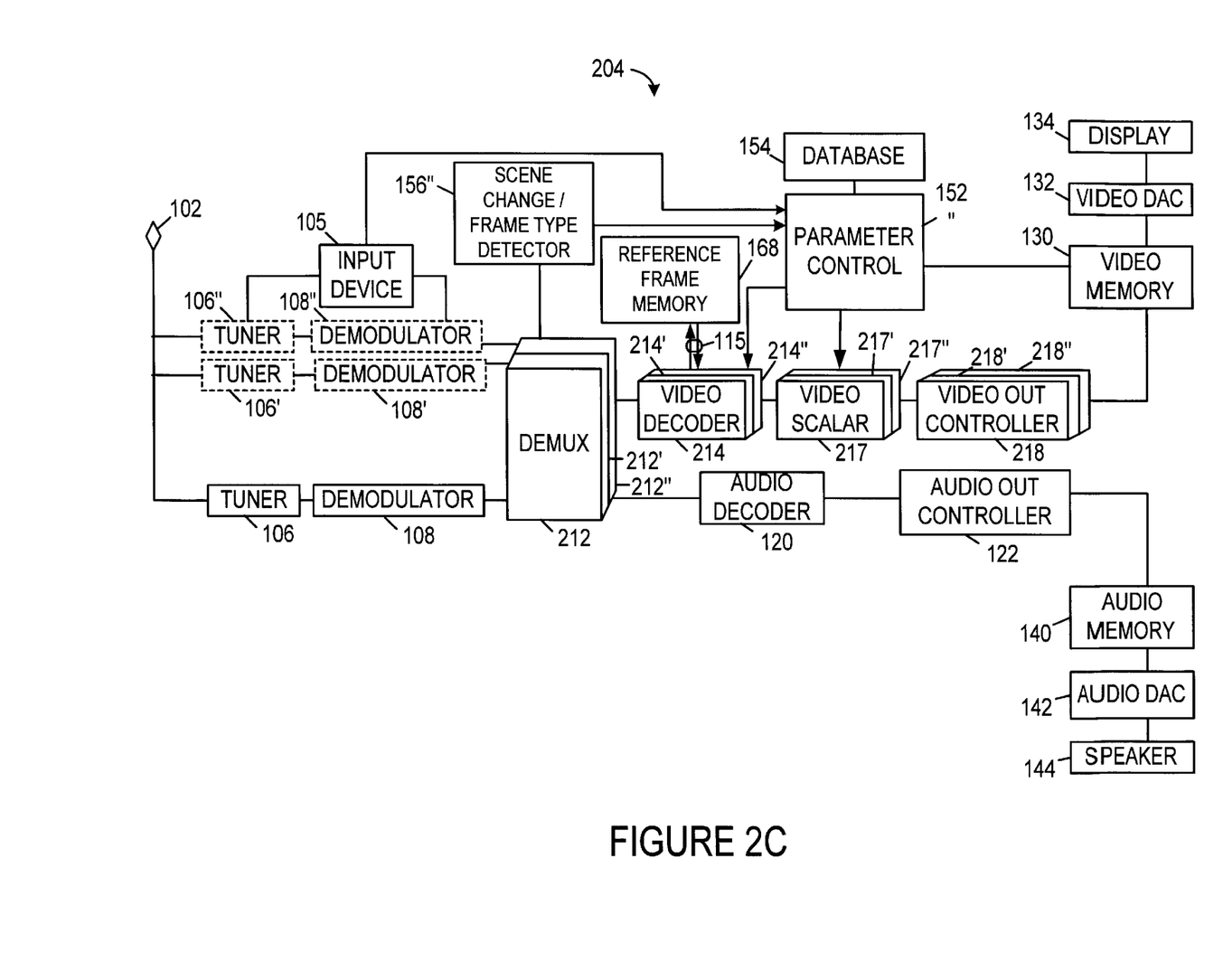

FIGS. 2A–2C illustrate various embodiments of the present invention, wherein the window size of one or more windows being displayed at the same time is adjusted so that the demand for system resources, e.g. the processor 110 and/or bus coupling the processor to video memory 130 will not exceed the available resources.

FIG. 2A illustrates an exemplary system 200 of the present invention wherein circuitry is added to insure that processing resources are allocated efficiently for the decoding and simultaneous display of multiple images corresponding to, e.g., different programs.

Elements of the FIG. 2A embodiment which are the same as, or similar to the elements of the FIG. 1 embodiment, are identified using the same reference numerals that were used in FIG. 1. For purposes of simplicity, such elements and their connections will not be discussed again.

The system 200 differs from the system 100 in that a scene change detector circuit 156, a parameter control circuit 152 and a database 154 have been added. In addition, in the system 200, the input device 105 provides input to the parameter control circuit 152 in addition to the tuner/demodulator pairs. Note also that in the system 200 the video scalar routines 117, 117', 117" are responsive to the parameter control circuit 152 and that the parameter control circuit 152 can access the video memory 130. While, in the FIG. 2A embodiment, the scene change detector 156 and parameter control circuit 152 are implemented as hardware circuits, it is to be understood that they could, and in one embodiment are, implemented as routines which are executed by the CPU 210.

The parameter control circuit 152 is responsible for performing various control functions intended to insure that the demand for system resources does not exceed the available resources. For example, it is used to calculate the load which will be placed on the available system resources given a set of window sizes, it adjusts the size of one or more windows to reduce the load on the available resources when necessary and it also limits which images processed for display when all of the images corresponding to all the programs to be displayed can not be decoded in the amount of time available, with the system resources.

Scene change detector 156 detects program frames with scene changes, e.g., significant changes in image content, in them. This may be done using scene change information broadcast with the received TV programs, in accordance with the present invention, as ancillary program data. Alternatively one or more known scene change detection techniques may be used to detect scene changes in the programs being decoded and displayed. Scene change detector 156 provides scene change information to the parameter control circuit 152 which controls the video decoder and/or video scalar routines so that at least some data representing frames without significant changes in them, will be ignored or disregarded under certain circumstances discussed below in regard to FIG. 5.

FIG. 2B illustrates another system 202 implemented in accordance with the present invention. The system 202 is similar to the system 200 of FIG. 2A. However, the system 202 differs from the system 200 in that a reference frame memory 168 used by the video decoder routines 114, 114' and 114" is explicitly illustrated. A bus 115 couples the reference frame memory 168 to the CPU 210' and thus the video decoder functionality implemented therein. The reference frame memory 168 is used to store frames which may be used for motion compensated prediction operations during decoding.

The system 202 also differs from the system 200 in that a RAM 160, used for storing decoder and control routines 162 and operating system 164, is illustrated. The control routines may be loaded into the parameter control circuit 152' via CPU 210'. The RAM 160 may include a non-volatile digital storage medium such as a hard disk, ROM, floppy disk, etc.

Note that in the system 202, the video decoder routines 114, 114' and 114" are responsive to the parameter control circuit 152' and perform decoding as a function of the size of the window in which the decoded images are displayed. Accordingly, in the FIG. 2B embodiment, the parameter control circuit 152' can reduce processing resource requirements by informing either or both the video decoder and video scalar routines that the window size associated with a particular program is being reduced. As in the case of the system 200, the parameter control circuit 152' may be implemented using a CPU, e.g., the CPU 210', to execute control routines stored in memory, e.g., the RAM 160.

System 202 includes a frame type detector 156' instead of the scene change detector 156 which is present in the system 200. The frame type detector 156' detects frame type by checking header information, e.g., in the video streams demultiplexed by DEMUX 112. Frame type detector 156' provides frame type information to parameter control circuit 152'. The parameter control circuit 152' uses the information under circumstances discussed below with regard to FIG. 5, to control the video decoder and/or scalar routines to ignore, discard, or disregard data corresponding to certain frame types.

FIG. 2C illustrates a system 204 which is functionally similar to the FIGS. 2A and 2B systems. However, in the FIG. 2C embodiment, the CPU is eliminated. In the FIG. 2C embodiment the functions previously performed using software are performed using physical circuits, e.g., de-multiplexer circuits 212, 212', 212"; video decoder circuits 214, 214', 214", video scalar circuits 217, 217', 217", video out controller circuits 218, 218', 218", audio decoder circuit 120 and audio output controller circuit 122. These circuits perform the same functions as the corresponding routines of FIG. 2B and are responsive to the parameter control circuit 152".

Figure 4:
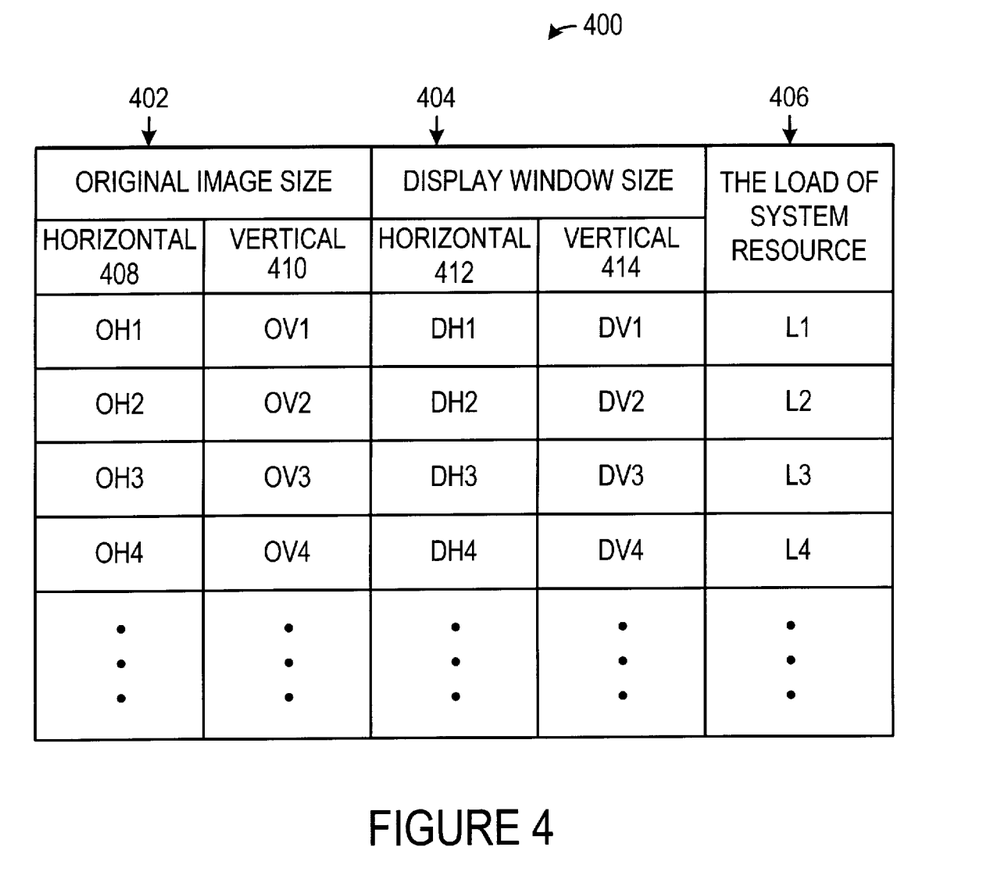
FIG. 4 illustrates exemplary contents of an information database of the type used in the FIGS. 2A–2C embodiments.

Referring now briefly to FIG. 4, exemplary contents of the database 154 are shown. As illustrated the database includes information 402 regarding the original encoded size of an image, information 404 on a display window size which may be used to display an image, and information 406 indicating the load, e.g., in terms of % of an available resource such as the CPU or system bus, which is required to decoded the image in a pre-selected amount of time, e.g., one or more frame times. Each row of the database 154 represents a different possible combination of input image size and display window size and the system load associated with decoding and displaying an image meeting the specified size conditions. The size of the original encoded image may be expressed in horizontal and vertical dimensions 408, 410. Similarly, the display window size may be expressed as horizontal and vertical dimensions 412, 414. While a single system load column 406 is illustrated in FIG. 4, additional columns may be included for each individual system resource of interest, e.g., there may be one column for CPU load and another for system bus load. Values in the database 154 may be pre-computed values, or values which are computed as needed, e.g., by the CPU 210 and then stored for subsequent use to avoid the need for determining resource loads in real time.

The total system load for decoding a set of images to be displayed on a display screen during any given pre-selected period of time may be computed as the sum of the loads for decoding each of the individual images to be displayed during the pre-selected period of time assuming that a single load measurement is being used as in the FIG. 4 example.

Figure 5:
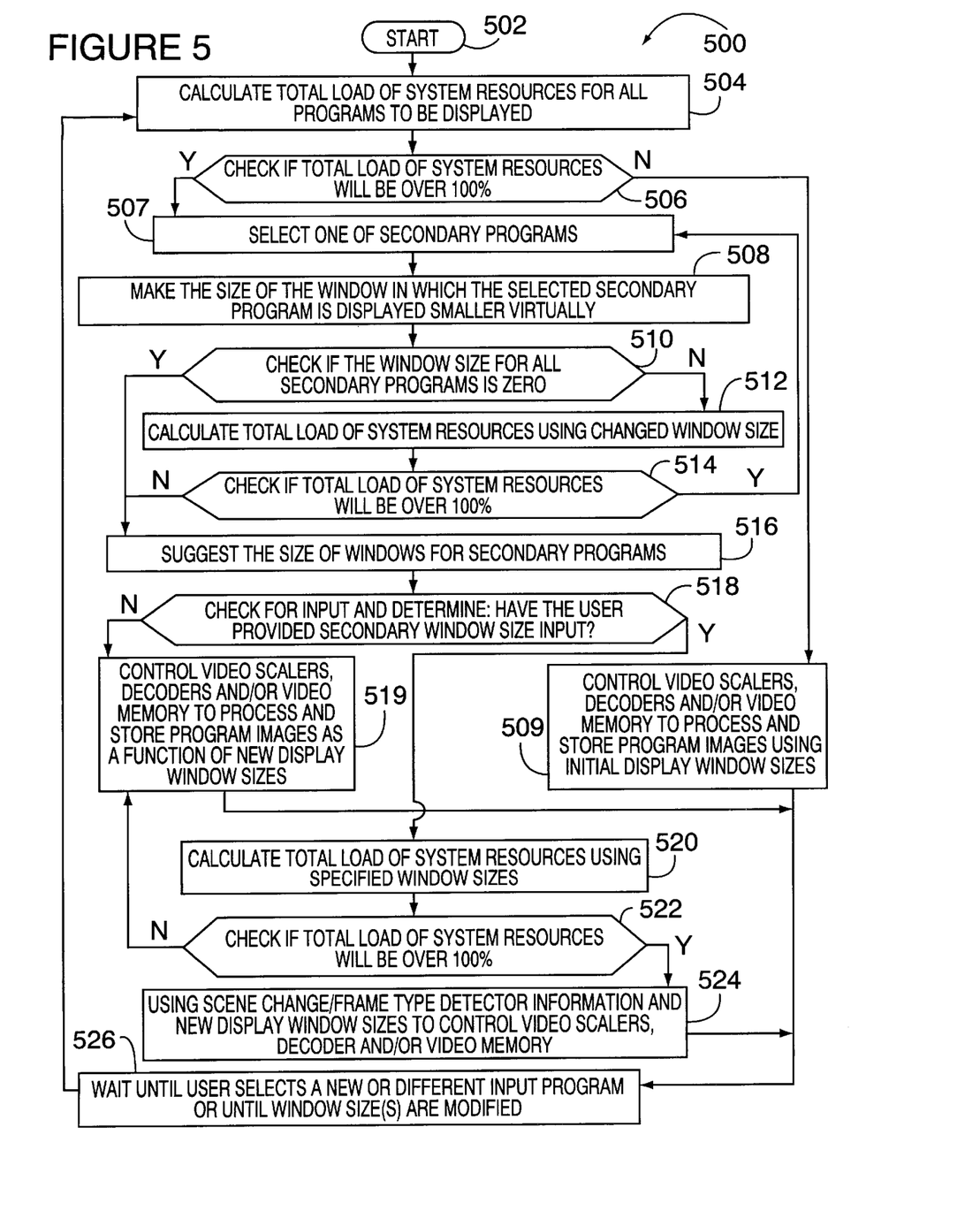
FIG. 5 is a flow chart illustrating steps which are performed as part of the operation of the systems illustrated in FIGS. 2A–2C.

The method of the present invention for controlling image scaling, decoding, and program window size, to insure that the demand on the resources of the system performing the decoding and other image processing operations is not exceeded, will now be discussed with regard to FIG. 5. The method of FIG. 5 may be implemented by the parameter control circuit 152, 152' or 152" illustrated in FIGS. 2A–2C. A set of computer executable instructions used to control the parameter control circuit may be stored in RAM 160.

As illustrated, the control method 500 of the present invention begins in step 502. In step 502 the parameter control circuit 152 is initialized with information relating to the number of programs to be displayed and the initial size of the program windows (display window size) in which they are to be displayed. This information may be obtained from user input or by accessing operating system information. Next, in step 504 the total load that will be placed on a system resource or resources is calculated using, e.g., encoded image size information (original image size) obtained from the encoded data the display window size information, and/or information on the number of images to be rendered, e.g., the number of programs to be displayed simultaneously. The data in the database 154 may be used to determine the load associated with each program or series of program images to be displayed. The total load for the given period of time for which the total load is being calculated is determined as the sum of the individual loads associated with displaying the images or images associated with each program. For simplicity, in the exemplary embodiment, the total load calculation is made for the most limited resource, e.g., the processor or the bus.

Alternatively, separate system load calculations may be performed for each system resource, and the techniques of the present invention may then be used to insure that the demand for resources does not exceed the availability of the various resources which are present in the system.

Once the total system load is calculated operation proceeds to step 506 where a check is made as to whether or not the total load will exceed the available system resources, e.g., if the total load is greater than 100%. If it is determined that the total load is under 100%, indicating that sufficient resources are available to decode and display all the images in the time period under consideration, operation proceeds to step 509. In step 509, the parameter control circuit 152 or 152' controls the video scalars, video decoders and/or video memory to process and store program images using the initial display window sizes. Operation then proceeds to step 526.

If, however, in step 506 it is determined that the load on system resources will exceed 100%, operation proceeds to step 507, wherein the system selects one of the secondary programs, e.g., the programs displayed in the smaller windows as opposed to the larger main window, to undergo a display window size adjustment.

Next, in step 508, the size of the window in which the selected secondary program is to be displayed is adjusted to make the window smaller. The adjustment is described as a virtual adjustment since, at this point in the routine, the adjusted size is used for calculation purposes and is not used to alter the size of the actual displayed window. The size reduction in step 508 may be by a pre-selected, e.g., fixed, amount.

From step 508, operation proceeds to step 510. In step 510 a determination is made as to whether or not the size of all the secondary programs has been set to zero. If the answer is yes, indicating that the secondary programs will not be displayed, operation proceeds to step 516.

However, if in step 510 it is determined that one or more of the windows associated with the secondary programs has not been reduced to zero, operation proceeds to step 512. In step 512 the total load on system resources is recalculated using the new reduced window size generated in step 508. Next, in step 514 a check is again made to determine if the total load on system resources will exceed 100%. If the answer is yes, operation proceeds once again to step 507 wherein a secondary program is selected to have its display window size reduced. Steps 507 through 514 will be repeated until all the secondary program windows are reduced to a size of zero or until the total load on system resources equals or is below 100%.

If, in step 514, it is determined that the load on system resources will be at or below 100%, indicating that the program images can be decoded and displayed using the adjusted secondary window sizes, operation proceeds to step 516.

In step 516, the user is presented, e.g., on the display device 134 with a set of suggested sizes for the secondary program windows. Then, in step 518, a check is made to determine if the user provided any screen size input information regarding the secondary windows. If in step 518, it is determined that the user agreed to the suggested window size or failed to provide input regarding window sizes, e.g., in a pre-selected time period such as 10 sec, operation proceeds to step 519. In step 519 the parameter control circuit 152, 152', or 152" controls the video scalars, decoders and/or video memory to process and store program images as a function of the new display window sizes, e.g., the virtually adjusted window sizes suggested to the user in step 516. Operation then proceeds to step 526.

In step 518, if it is determined that the user provided input on the secondary window sizes, the input is collected and operation proceeds to step 520. In step 520, the total load of system resources is recalculated using the new window sizes, e.g., the new window sizes selected or provided by the user. Next, in step 522, a determination is made as to whether or not use of the new window sizes will exceed 100% of the system's available resources. If it is determined that the new window sizes will not result in a demand for available resources that exceeds actual availability, operation proceeds to step 519.

However, if in step 522, it is determined that use of the new window sizes provided by the user will require more system resources than are available for the decoding and displaying of images, operation proceeds to step 524. In step 524, input from a scene change detector circuit 156, a frame type detector circuit 156' or a combined scene change/frame type detector circuit 156" are used to control video decoding and/or display operations. As discussed above, the scene change detector 156 or scene change portion of detector 156" detects program frames with scene changes, e.g., significant changes in image content, in them. This may be done using scene change information broadcast with the received TV programs, in accordance with the present invention, as ancillary program data. Alternatively one or more known scene change detection techniques may be used to detect scene changes in the programs being decoded and displayed. The frame type detector circuit 156' or frame type detector portion of the detector 156", as discussed above, detects the type of frame to which data corresponds by checking header information in the video streams demultiplexed by DEMUX 112 or 212. The parameter controller 152" is responsive to the scene change and/or frame type information provided by the scene change/frame type detector circuit 156".

In one embodiment in step 524, frames corresponding to one or more secondary programs having significant changes in them, e.g., major changes in content, are identified and processed. In addition, some or all the data of one or more secondary programs corresponding to images which do not represent major scene changes is not used, e.g., it is ignored or discarded. In this manner the demand for processing resources is reduced.

In another embodiment, in step 524, data corresponding to inter-coded frames corresponding to one or more of the secondary programs are identified and ignored. Thus, the demand for decoding, scaling and other resources is reduced by ignoring one or more inter-coded frames of at least one secondary program. In yet another embodiment, the scene change detection information is used in combination with the frame type information resulting in a process implemented, e.g. by the system 204, where, in step 524, data corresponding to some frames of secondary programs without significant scene changes is ignored and where some inter-coded frames of one or more secondary programs are ignored, e.g., not decoded and displayed. Operation proceeds from step 524 to step 526.

In step 526, the parameter control circuit 152, 152', 152" waits until a different input program has been selected by the user of the system or one or more of the display window sizes have been changed, e.g., by the user. Operation then proceeds to step 504 wherein the load calculation is performed once again.

Using the method 500, it is possible to control the decoding and display of multiple images which will be displayed simultaneously on a single screen. The method of the present invention insures that decoding and display of the main program will occur properly and that the demand for system resources resulting from the decoding and display of secondary programs or images will be limited to the available system resources. The method of the present invention also provides for system resource allocation in a manner that is intended to minimize problems in the secondary images.

What is claimed is:

1. A method of processing image data in a period of time, using a system having a limited resource, the data corresponding to multiple images are displayed on a single display screen in a plurality of windows initially having input window sizes, the method comprising the steps of:

determining if the amount of the limited resource required to process the images for display in the plurality of windows having the input sizes in said period of time will exceed the availability of the limited resource; and if is determined that the amount of the limited resource required to display the images will exceed the availability of the limited resource, performing the step of:
adjusting the size of a secondary one of the plurality of windows; and
using the limited resource to process at least some of the image data as a function of the adjusted window size.

2. The method of claim 1, wherein if it is determined that the amount of the limited resource required to display the images will not exceed the availability of the limited resource, the method further comprises the step of:

using the limited resource to process the image data for display using the input window sizes.

3. The method of claim 1, wherein the step of adjusting the size of one of the plurality of windows includes the step of:

reducing the size of one of the plurality of windows; and
determining if the amount of the limited resource required to process the images for display using said reduced size window in place of one of the input window sizes will exceed the availability of the limited resource in said period of time.

4. The method of claim 3, wherein the step of adjusting the size of one of the plurality of windows includes the step of:

repeating the reducing and determining steps until:
i) the size of said one of the plurality of windows is set to zero; or
ii) it is determining if the amount of the limited resource required to process the images for display using said reduced size window in place of one of the input window sizes will exceed the availability of the limited resource in said period of time.

5. The method of claim 1, wherein the step of adjusting the size of a secondary one of the plurality of windows includes the steps of:

reducing the size of one of the plurality of windows; and
presenting a viewer with a set of suggested window sizes including the reduced window size.

6. The method of claim 5, further comprising the step of:
monitoring to detect user window size input.

7. The method of claim 6, further comprising the step of:
controlling the limited resource as a function of detected user window size input.

8. The method of claim 7, wherein the step of controlling the limited resource as a function of detected user window size input includes the step of:

determining if the amount of the fixed resource required to process the images for display using window sizes specified by the user window size input will exceed the availability of the limited resource.

9. The method of claim 8, further comprising the step of:
if is determined that the amount of the fixed resource required to process the images for display using window sizes specified by the user window size input will exceed the availability of the limited resource:
detecting data corresponding to inter-coded frames; and
controlling the limited resource so that data corresponding to at least some of the inter-coded frames is discarded by the limited resource.

10. The method of claim 8, further comprising the step of:
if is determined that the amount of the fixed resource required to process the images for display using window sizes specified by the user window size input will exceed the availability of the limited resource:
detecting data corresponding to images including significant scene changes; and
controlling the limited resource so that data corresponding to the significant scene changes is processed while image data corresponding to at least some images without significant scene changes is not processed.

11. The method of claim 10,
wherein processing of image data includes the step of decoding said image data.

12. The method of claim 1,
wherein the input window sizes include one primary window size and two secondary window sizes; and
wherein the step of adjusting the size of at least one of the plurality of windows includes the step of:
reducing the size of the two secondary window sizes.

13. The method of claim 1, wherein the step of adjusting the size of at least one of the plurality of windows includes the step of:

determining if the amount of the limited resource required to process the images for display using said primary window size and two secondary reduced window sizes will exceed the availability of the limited resource in the set amount of time.

14. The method of claim 1,
wherein the limited resource is a processor.

15. The method of claim 1,
wherein the limited resource is bus bandwidth.

16. A machine readable media, comprising computer executable instructions for controlling a system including a limited resource to process image data in a pre-selected amount of time, the image data corresponding to multiple images are displayed on a single display screen in a plurality of windows, the instructions comprising the steps of:
determining if the amount of the fixed resource required to process the image data for display in said windows in the fixed amount of time will exceed the availability of the limited resource, each of said windows corresponding to a rectangular area; and
if is determined that the amount of the fixed resource required to display the images will exceed the availability of the limited resource, performing the steps of:
reducing a size of at least one of the windows thereby reducing the rectangular area of said at least one window; and
using the limited resource to process at least some of the image data as a function of the reduced window size.

17. The computer readable medium of claim 16, wherein the step of reducing a size of at least one of the windows includes the step of reducing said window size until the amount of the limited resource required to display the images using the reduced window size, will not exceed the availability of the limited resource.

18. A system for processing data representing a plurality of video programs to generate a screen including a plurality of windows, each window corresponding to a different one of said video programs and having a window size, the system comprising:
a system resource used to process the data representing said plurality of video programs;
means for determining if a processing load that will be placed on said system resource given a set of window sizes to be used in displaying said plurality of windows will exceed the processing capacity of said resource; and
means for adjusting at least one window size in said set of window sizes to reduce the processing load when it is determined that that the processing load that will be placed on said system resource will exceed the processing capacity of said resource.

19. The system of claim 18, wherein the means for adjusting adjusts at least one window size until the processing load that will be placed on said system resource will be within the processing capacity of said resource.

20. The system of claim 19, further comprising:
a display device, for displaying the video content of said video programs coupled to the system resource and adjusting means;
an input device, for receiving information from a user of the system regarding window size, coupled to the adjusting means.

21. The system of claim 20, further comprising:
a scene change detector circuit for detecting frames of programs including significant scene changes.

22. The system of claim 21, wherein the means for adjusting is part of a control circuit, said scene change detector circuit being coupled to the control circuit, the control circuit including means for controlling the system resource to disregard program data corresponding to at least some frames which are determined not to include significant scene changes.

23. The system of claim 20, further comprising:
a frame type detection circuit for detecting program data corresponding to inter-coded frames.

24. The system of claim 23, wherein the means for adjusting is part of a control circuit which is coupled to the frame type detection circuit, the control circuit including means for controlling the system resource to disregard at least some program data corresponding to inter-coded frames.

\* \* \* \* \*